United States Patent [19]

Shimizu et al.

[11] Patent Number: 4,459,008

[45] Date of Patent: * Jul. 10, 1984

[54] CAMERA HAVING A SOUND-MAKING ELEMENT

[75] Inventors: Masami Shimizu, Tokyo; Masanori Uchidoi; Nobuaki Date, both of Kanagawa; Hiroshi Aizawa, Kawasaki, all of Japan

[73] Assignee: Canon Kabushiki Kaisha, Tokyo, Japan

[*] Notice: The portion of the term of this patent subsequent to Sep. 23, 1997 has been disclaimed.

[21] Appl. No.: 324,481

[22] Filed: Nov. 23, 1981

Related U.S. Application Data

[63] Continuation of Ser. No. 151,698, May 20, 1980, Pat. No. 4,322,146, which is a continuation of Ser. No. 907,853, May 19, 1978, Pat. No. 4,223,987.

[30] Foreign Application Priority Data

May 30, 1977 [JP] Japan .................................. 52-63064

[51] Int. Cl.³ ...................... G03B 7/081; G03B 17/18; G03B 17/38
[52] U.S. Cl. ................................ 354/467; 354/238.1; 354/289.12
[58] Field of Search ........... 352/170; 354/23 D, 60 R, 354/60 E, 238, 289

[56] References Cited

U.S. PATENT DOCUMENTS

| | | |
|---|---|---|
| 3,592,113 | 7/1971 | von Wasielewski .............. 354/53 X |
| 3,776,625 | 12/1973 | Fountain .............................. 352/170 |
| 3,956,758 | 5/1976 | Numata et al. ....................... 354/53 |
| 4,072,973 | 2/1978 | Mayo .............................. 354/238 X |
| 4,092,062 | 5/1978 | Kittag ................................. 352/170 |
| 4,134,660 | 1/1979 | Sakurada et al. ............... 354/238 X |
| 4,223,987 | 9/1980 | Shimizu et al. ................. 354/238 X |
| 4,235,538 | 11/1980 | Uchidoi et al. ............... 354/60 E X |
| 4,322,146 | 3/1982 | Shimizu et al. ................. 354/238 X |

FOREIGN PATENT DOCUMENTS

| | | |
|---|---|---|
| 48-53719 | 7/1973 | Japan . |
| 50-46115 | 5/1975 | Japan . |
| 51-23340 | 6/1976 | Japan . |

Primary Examiner—Michael L. Gellner
Attorney, Agent, or Firm—Toren, McGeady and Stanger

[57] ABSTRACT

In the disclosed camera a sound-making element is provided to produce warning signals or confirming signals for operation of a self-timer. A binary counter which digitally controls the camera controls the sound-making element. Warning signals and confirming signals for operation of a self-timer are distinguished from each other by a difference in oscillation pulses.

6 Claims, 14 Drawing Figures

$Q_{13}$ — FIG. 10a
$Q_{14}$ — FIG. 10b
$Q_{15}$ — FIG. 10c
$\overline{Q_{13}} \cdot \overline{Q_{14}}$ — FIG. 10d
$\overline{Q_{14}} \cdot \overline{Q_{15}}$ — FIG. 10e
$\overline{Q_4}$ — FIG. 10f
$\overline{Q_4} \cdot (\overline{Q_{13}} \cdot \overline{Q_{14}})$ — FIG. 10g
$\overline{Q_4} \cdot (\overline{Q_{14}} \cdot \overline{Q_{15}})$ — FIG. 10h

CAMERA HAVING A SOUND-MAKING ELEMENT

This is a continuation of application Ser. No. 151,698 filed May 20, 1980, now U.S. Pat. No. 4,322,146 which is a continuation of application Ser. No. 907,853, filed May 19, 1978, now U.S. Pat. No. 4,223,987.

FIELD OF THE INVENTION

The present invention relates to a piezoelectric camera having a sound-making element positioned at a place such as a back lid, a bottom lid, a top lid, etc.

OBJECT OF THE INVENTION

A object of the present invention is to provide a camera in which a piezo buzzer element is placed at a suitable position of the camera and sound signals therefrom are used as various warning means.

A second object of the present invention is to use a digital control circuit as an activating means for a sound-making element in a camera in which a photo-taking process of the camera (light sensing—detection of input information—operating exposure value—activation of exposure control mechanism—exposure) is digitally rather than analog controlled.

A third object of the present invention is to provide a device to identify photo-taking states with sound signals from a sound-making element in a camera and actuating the element by the photo-taking action of the camera in a photo-taking apparatus composed of a combination of a camera and interchangeable lenses.

A fourth object of the present invention is to provide a camera which satisfies the requirement mentioned in the second object and has means for stopping the sound.

A fifth object of the present invention is to provide a camera in which the volume of a sound signal of the element can be changed when the camera is set for allowing a self-timer to operate.

Other objects of the present invention may be apprehended from the following.

DESCRIPTION OF THE PRIOR ART

For enhancing the handling characteristics of a camera, efforts are being made to reduce its size and weight. As a means to achieve said object, electronic and automatic means are being used therein.

As more electronic and automatic means are used in a camera it becomes necessary to to inform a photographer of exposure information. Further various warning means are provided to prevent a camera from being operated for improperly. Conventional warning have been generally provided by a display. Examples of such displays are:

(1) A display which provides an excess light warning or a low brightness warning when an exposure control mechanism senses that the object is excessively or inadequately lighted.

(2) a hand shaking warning when an exposure control mechanism is set at a shutter speed zone that a hand shaking could affect a photography;

(3) warning display indicating that the voltage of a power source is below a prescribed value; and (4) a display to inform the operator that a self-timer is operative when the self-timer is of the electronics type.

These warnings have been given by a flickering illumination display within a view finder of a camera or by a display signal outside of a camera using an illumination element. They serve as a means for warning or as a means for confirming an operating state.

However, warnings given for a camera by a display signal have disadvantages as more electronics are used in a camera. That is the more electronics used in a camera the more it becomes necessary to display photo-taking informations at a specified position of the camera (with a view finder, at an upper part of the camera, etc.). And because of the flood of information there exist the possibilities that erroneous operations and erroneous handling of a camera occur as a result of an error in visual confirmation. To avoid such erroneous operation and erroneous handling a sound warning has been proposed.

That is, a camera having a sound-making element and a control circuit therefor being built in the camera has been proposed.

There are a number of prior art examples of a camera having a sound-making element.

German Pat. No. 1297461 discloses a conventional camera having a sound-making element, in which an exposure regulating circuit and an oscillation circuit are combined and a speaker is actuated in response to an output signal from the exposure regulating circuit. Also in Japanese Patent Application Laid-Open No.Sho 49-16420 and U.S. patent application Ser. No. 275,690 filed on July 27, 1972- Japanese Patent Application Laid-Open No. Sho 49-59638 a control circuit of a stroboscopic device and a speaker device are combined and completion of the operational preparation for a stroboscope is confirmed by a sound signal from an ear-phone.

Said conventional inventions have disadvantages in that a speaker used as a sound-making element increases the camera size and gives it poor handling characteristics.

Furthermore many kinds of cameras introduced in the market have a digital light sensing, and measuring device as well as diaphragm aperture control and shutter control etc. This helps the exposure control operation of a camera to perform precisely. Also, each component part of the camera has a sequence control. But none of such types of cameras have a sound-making element being equipped therein.

DESCRIPTION OF PREFERRED EMBODIMENT

Figures 1A, 1B, 2:
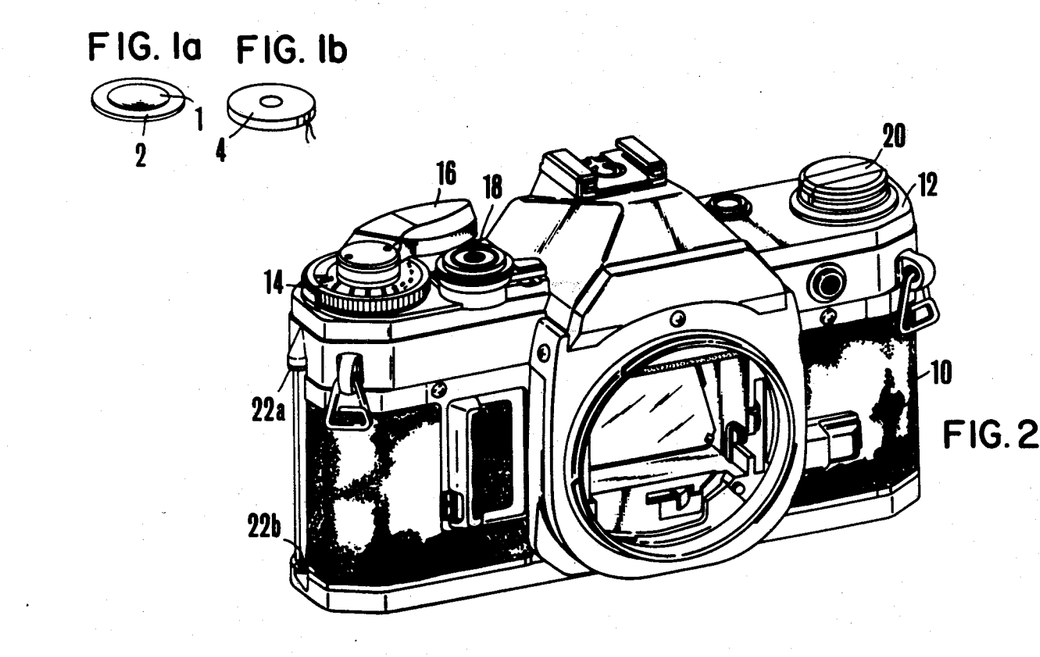
FIG. 1(a) is an oblique view of a piezo-element of a sound-making element used in the present invention.
FIG. 1(b) is an external oblique view of said piezo-element shown in FIG. 1(a) as housed in a case.
FIG. 2 is an external view showing an example of a camera having a back lid.

FIGS. 1a and 1b show a sound-making element to be attached to a camera. The sound-making element, includes (a) a piezo buzzer element made by cementing a piezo electro-magnetic plate 1 and a metal plate 2, and (b) a piezo buzzer sound-making element 4 having a piezo buzzer element housed in a case.

These elements are selected depending on the type of a camera in which they are used and the position at which an element is attached.

When a piezo buzzer element expands or shrinks as the piezo electric-magnetic device receives an electric signal, the piezo buzzer element vibrates and oscillates, oscillating air thus generating sound waves.

While, such type of sound-making element can be used in different types of cameras now in the market, the disclosed embodiments involve examples using single lens reflex type (TTL) cameras.

FIG. 2 shows a front perspective view of a single lens reflex camera body 10 (hereinafter called the camera 10). In the following example of the present invention, the above mentioned type of piezo buzzer element is placed in a suitable position in the camera.

A piezo buzzer element has a thin shape and small size and can be positioned on the back lid, the bottom lid on the upper lid of a camera.

Figures 3A, 3B:
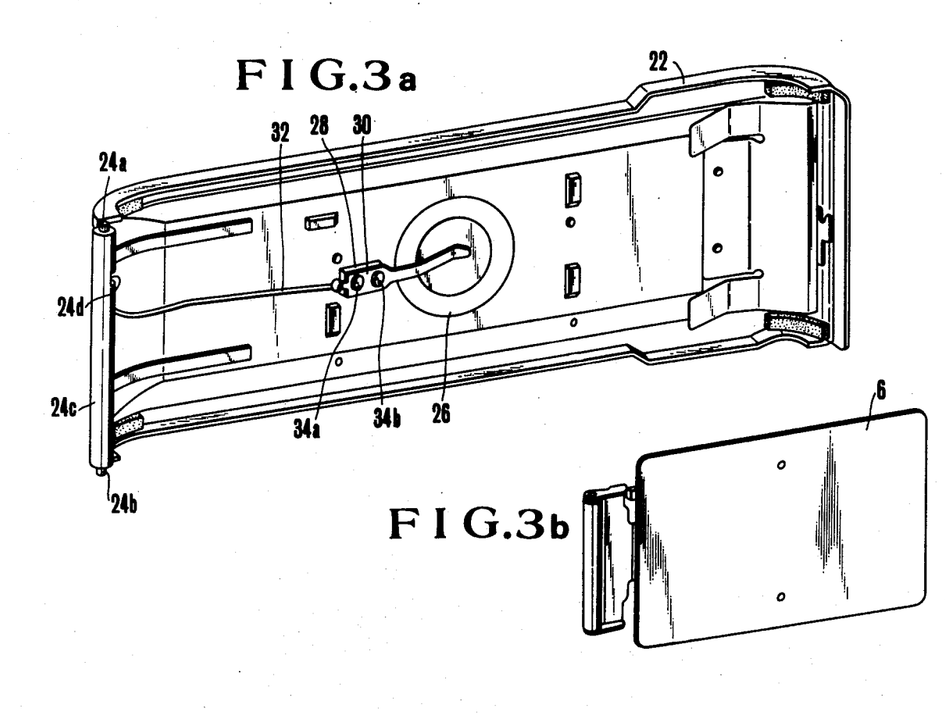
FIG. 3(a) is a set up drawing showing an internal plane of a back lid of the camera shown in FIG. 2.
FIG. 3(b) is an oblique view of a film pressing plate attached to the back lid of the camera.

FIG. 3(a) shows an internal surface of a back lid 22 of the camera in FIG. 2 Here, the piezo buzzer element is placed at the inner plane of the back lid and illustrates a first example of the unable positions.

FIG. 3(b) shows the a film pressing plate 6 normally attached to the inner plane of the back lid.

The camera in FIGS. 2, 3(a), 3(b), includes an upper lid 12. A shutter dial 14, a wind up lever 16, a shutter button 18, a rewinding crank lever 20, etc. are mounted on the upper lid 12 of the camera.

In this example the back lid 22 can be interchanged, and a hinge arrangement 24 to 24d for replacing the back lid can also operate as a terminal for supplying power to the piezo buzzer element.

In FIG. 2, bearing parts to 22a and 22b serve to hold the back lid 22 on the camera main body 10. Hinge shafts 24a, 24b of the back lid 22 engage the bearing parts 22a, 22b, so that the back lid can be opened and closed. The hinge shafts 24a, 24b are retained in a shaft housing 24c of the back lid 22, and either one of them is biased outwardly by a spring housed within the shaft housing 24c. The back lid can be easily removed or mounted by drawing down the hinge shaft through a knotched part 24d. A sound-making element 26 is fixed on the back lid in a gap between the film pressing plate 6 and the back lid 22. The aforementioned piezo buzzer element is quite suitable for such narrow space. A thin piezo buzzer element with a diameter of about 30 mm and a thickness of about 0.5 mm, and one with a diameter of 21 mm and a thickness of about 0.43 mm are available in the market. And such piezo buzzer element is well known as an electronics circuit part. According to an embodiment, the piezo buzzer element is attached to the back lid 22, the piezo electro-magnet plate 1 of the piezo element, instead of the metal plate 2, may be directly attained to a metal surface of the back lid.

To operate to the sound-making element, electric signals are supplied between the piezo element 1 and the metal plate 2 to generate distortion in the piezo element 1, piezoelectrically and the desired thus making sound by piezo effect.

In the embodiment shown, the metal plate 12 is connected to the back lid and hence to the hinge shafts 24a and 24b as well as to the bearing parts 22a and 22b of the camera body and the ground of the camera body 10.

The piezo element 1 has an electric signal input applied therein through wiring 32 and a terminal 30 insulated by an insulating plate 28. Elements 34a, 34b are fixing members, screws and caulking pins, etc. for the insulating plate 28 and the terminal 30.

Figure 4:
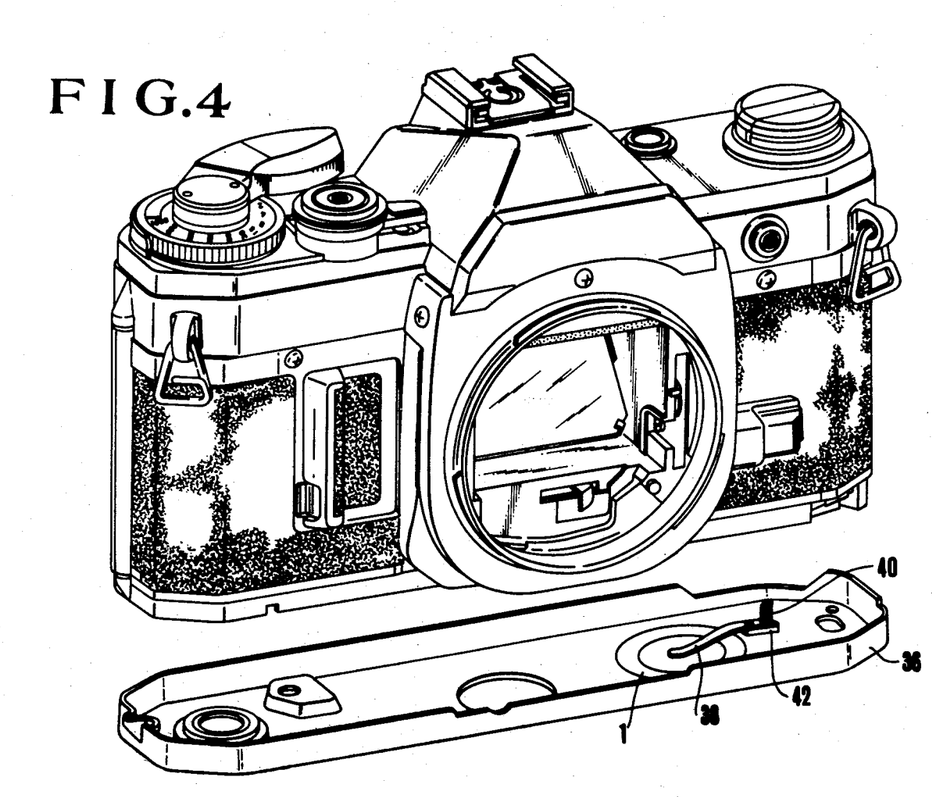
FIG. 4 is a drawing to show a state in which a piezo-element is attached to a bottom lid of a camera.

FIG. 4 shows an embodiment in which a sound-making element is positioned a bottom lid 36 of a camera. Here, a sound-making element (a piezo element 1, a metal plate 2) is mounted in a spare space inside of a bottom plate 36 and the metal plate 2 is connected from the metal part of the bottom lid to the camera body ground.

The piezo element 1 is connected to a circuit terminal of a camera body to be described below through a terminal 38 and a coil spring 40. An insulating plate 42 insulates the terminal 38 from the bottom plate 36. A screw or a caulking pin, etc. mount the plate 42 and the terminal 38 on the lid.

Figure 5:
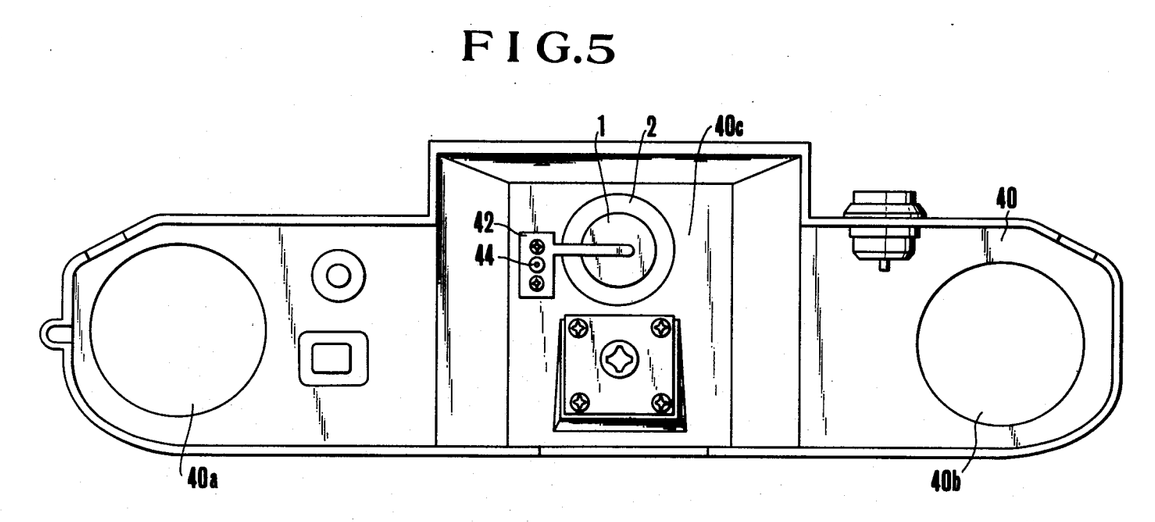
FIG. 5 is a drawing to show a state in which a piezo element is attached to a flat plane of a pentagonal prism housing part at a top lid of the camera.

FIG. 5 is a bottom view of an upper lid showing an embodiment in which a sound-making element is positioned on an upper lid 40 of a camera. Openings 40a, 40b serve to receive insert shafts of a film winder, a rewinder and a handling lever, etc. A recess 40c serves to house a pentagonal prism not shown in the drawing and the sound making element 1,2 is fixed at a bottom surface of the recess. The metal plate 2 and the piezo element 1 are mounted on the bottom surface of the recess 40c, and a terminal 42 makes contact with the piezo element 1. A signal pin 44 protrudes from the terminal 42 and is connected to a circuit terminal at a camera body (not shown) when the upper lid 40 is placed over the camera body.

Each of the structures holding the sound-making element, i.e., the back lid, bottom lid and upper lid has a comparatively large than surface capable of amplifying of the sound by resonance. When a bottom lid or upper lid has a comparatively uneven external surface or large thickness, an oscillating (vibrating) plate or sounding board may be provided between the metal plate 2 and each of the lids amplifying the sound.

Figure 6:
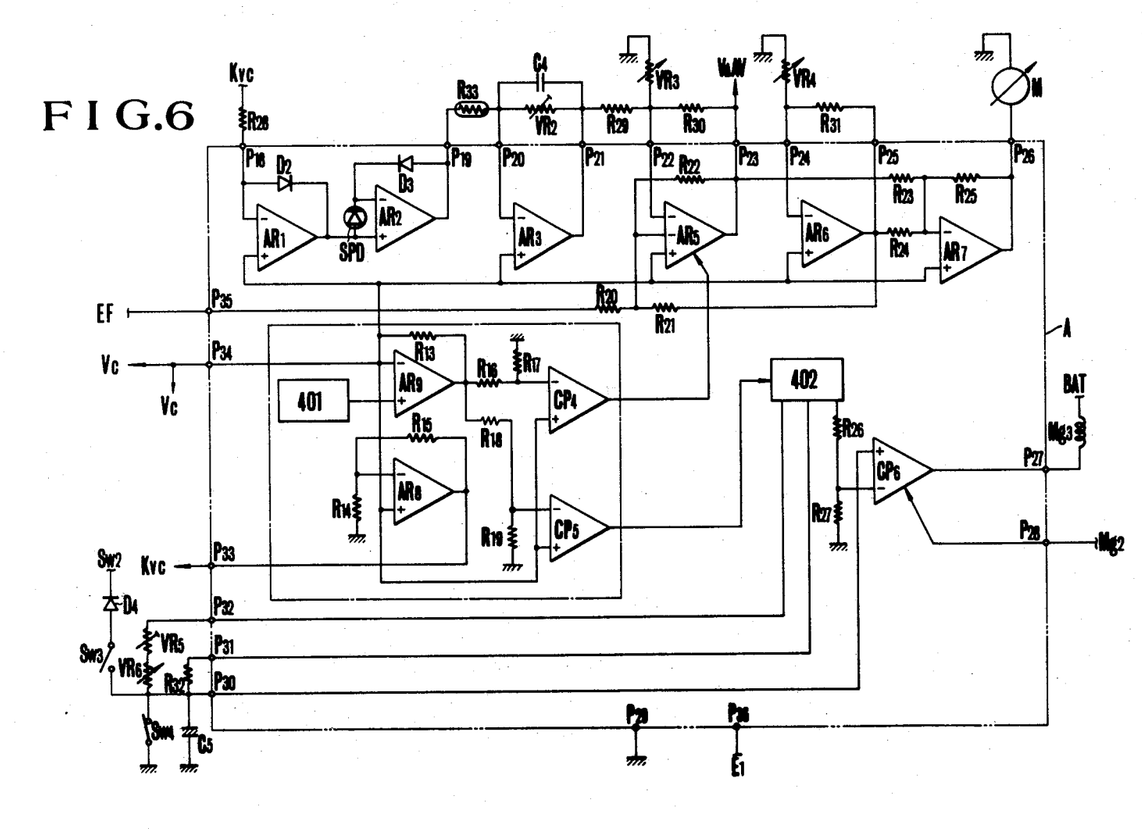
FIG. 6 is an exposure control circuit showing a light sensing circuit, an exposure value operating circuit, and an indication circuit, etc. of the camera.

An example of an exposure control circuit of a camera having a sound-making element or elements placed at one of said positions or at two or more positions appears in FIG. 6.

According to an embodiment of this invention, the camera uses an electric circuit in which an exposure control operation starts with a shutter release, proceeds to light sensing, and digitally controls the exposure on the basis of the counting output of a binary counter. Also, the camera detects whether a motor drive unit (MD) is mounted or not, whether a self-timer is working or not and a full open aperture value of an interchangeable lens mounted, and utilizes this information for logically controlling the signals thereof. The circuit of FIG. 6 shows a light sensing part, an operating part and a shutter time control part, etc. In this drawing, a part A enclosed by dotted lines can be made of integrated circuits for simplifying the circuit arrangement. Identification marks P18 to P35 show terminals within the dotted lines, that is input and output terminals for electric signals, and external parts and a power source are connected thereto.

The output terminal of a photo-voltaic element SPD (for example, silicone photo diode, SPD) is connected to between two input terminals of an operational amplifier AR2. Also, a diode D3 to logarithmically compress photocurrent is connected between the input and output terminals of said amplifier AR2. The amplifier AR2, the element SPD, the diode D3, etc. constitute a light sensing circuit to output such electric signal as corresponding to an object brightness.

An operational amplifer AR1 and a temperature compensating diode D2 connected to between input and output termianls thereof cooperate to compenstate for changes in temperature. A reference voltage (Kvc) from a detection circuit B to be described later is input into the amplifier AR1 through a resistance R28, the terminal P18. The amplifier AR1, the diode D2, etc. constitute a temperature compensation circuit. Said compensation circuit has such set up that current being equivalent to photo current generated at the SPD flows to the diode D2 for temperature compensation by a function of the resistance R28 at the reference temperature within such brightness zone as requiring temperature compensation therefor. A resistance element R33 for temperature compensation has a positive temperature coefficent. A capacitor C4, and a resistance VR2 form a prevention circuit to prevent flicker noise caused by such light source as a fluorescent lamp to illuminate an object when the light receiving element SPD has a response characterics with a very high speed.

What is shown as AR5 is an amplifier for operating an exposure value, and has an object brightness information (Bv) from the light sensing circuit input therein through a resistance R29. The amplifier AR5 constitutes an exposure value operating circuit. What is shown as VR3 is a variable resistance constituting a conversion means which outputs an electric signal corresponding to set values of shutter time information (Tv) and a film sensitivity information (Sv) being input and set from an outside of a camera.

Figure 7:
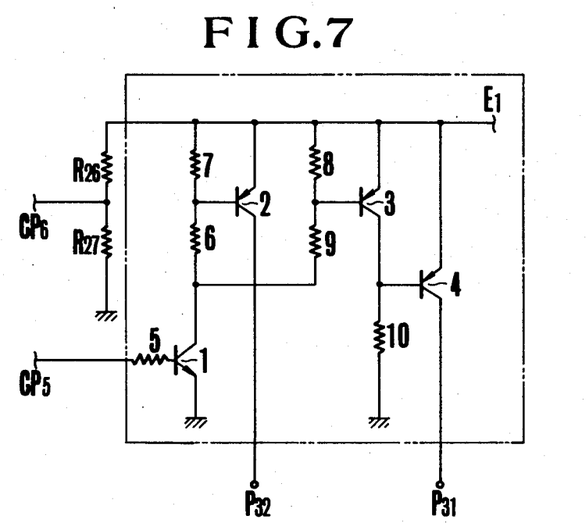
FIG. 7 shows an example of a change over circuit shown by an identification number 302 in FIG. 6.

The operational amplifier AR5 has an object brightness information (Bv), a shutter time information (Tv), and a film sensitivity information (Sv) input therein and conducts photographic computation, further has an aperture stop down step number information (V$\Delta$AV) output at its output terminal then the signal thereof is taken out of the terminal P23. An amplifier AR6 and a variable resistance VR4 constitute a full open F-value output means containing a conversion means which outputs an electric signal corresponding to a full open F-value (Avo) of a lens mounted on the camera. An operational amplifier produces absolute aperture value information (hereinafter called as Av) and enters the aperture stop down step number information (V$\Delta$AV) from AR5 and the full open F-value information (Avo) of a lens and operates an absolute value information of aperture for entering an aperture value (Av) into a meter M through the terminal P26. The AR7 and the meter M constitute an exposure value indication means. A circuit B enclosed by one dot chain line is a detection circuit which controls an electromagnet Mg1 of a diaphragm aperture control means to such value as corresponding to an object distance information when a stroboscopic device is mounted on the camera and is to change over the output of the exposure value operation circuit to a specific level for a shutter time for stroboscopic device. What is shown as 402 is a change over circuit to change over a shutter time information corresponding to a signal from the detection circuit, and a circuit diagram thereof is shown in FIG. 7. In FIG. 7, what are shown as P31, P32 are same as the circuit terminals P31, P32 in FIG. 6. What is shown as 401 is a known type of a constant voltage circuit and has a power supplied from the power source circuit. The change over circuit 402 consists of four transistors 1 to 4 and resistances 5 to 10 as shown in the drawing. An output of a comparator CP5 of the detection circuit B is connected to a base of the transistor 1 through the resistance 5. The collectors of the transistors 2 and 4 are connected to the circuit terminals P32 and P31. When a signal EF for stroboscope not being shown in the drawing is applied to a circuit terminal P34 in response to a charging completion signal of the stroboscopic device, current flows out of an inversion input terminal P34 of the amplifier AR9 and an output voltage of the amplifier AR9 becomes to have a high level and an output of the comparator CP5 becomes to have a low level.

When the output of the comparator CP5 is at a low level the transistors 1 to 3 turns OFF while the transistor 4 turns ON and a voltage is impressed on the circuit terminal P31.

When a voltage is impressed on the circuit terminal P31, a comparator CP6 for controlling an action of a shutter follower screen not being shown in the drawing is actuated based on a time constant determined by a resistance R32 and a capacitor C5, and a shutter time is controlled to a shutter time for flash light photography (for example 1/60 second). Also, a diaphragm aperture control system has its exposure information controlled in response to a diaphragm aperture signal (EF) for flash light photography being input from the stroboscopic device through a circuit terminal P35. When the signal EF for stroboscope is not impressed on the circuit terminal P34, the output voltage of the amplifier AR9 drops down to a low level while the output of the comparator CP5 goes up to a high level. When the output of the comparator CP5 goes up to a high level the transistors 1 to 3 become ON while the transistor 4 becomes OFF and a voltage is impressed to the circuit terminal P32, then a shutter time is controlled based on a set shutter time information determined by the variable resistances VR5, VR6 and the capacitor C5, thus the diaphragm aperture control system is controlled based on a result of operation.

A magnet to Mg2 effects starting action of the camera as will be explained later, and a magnet Mg3 retains a shutter follower screen after a shutter leader screen starts and controls the running of the follower screen based on the above mentioned shutter time for flash light photography (determined by a time constant of the resistance R32 and the capacitor C5) or on a set shutter time (determined by a time constant of the resistances VR5, VR6 and the capacitor C5).

A variable resistance VR5 serves for regulating a time of high speed shutter time. A above mentioned variable resistance VR6 serves for shutter time associated with a shutter dial to be operated and set from an outside of the camera, which will be explained later.

A switch SW2 is closed by a second stroke in a shutter release action. A bulb switch SW3 serves to prevent the charging of the capacitor C5 for time constant circuit at a time of bulb photography. A counting switch SW4 is opened in an association with a starting of the shutter leader screen and starts the charging of the capacitor C5.

Figure 8:
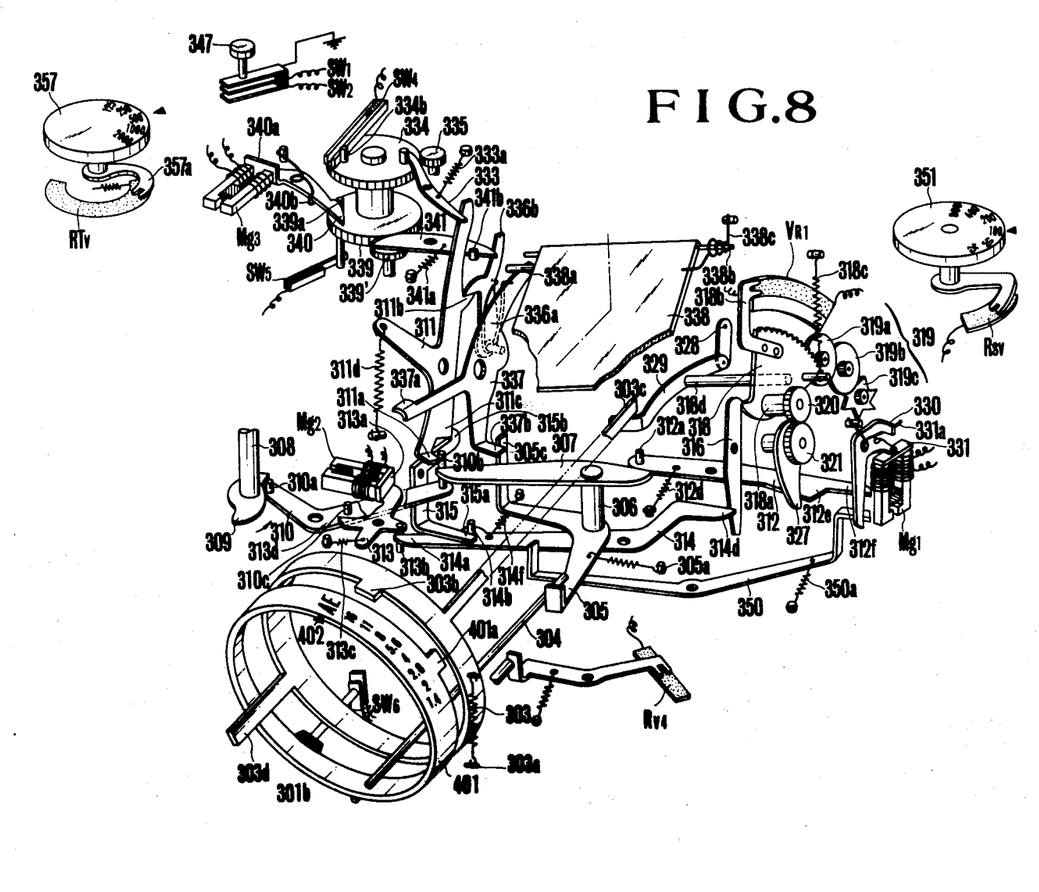
FIG. 8 is a mechanical drawing of a camera operated with circuits of the percent invention.

FIG. 8 is an exploded perspective view to show a set up an important part of a mechanism in an example of a camera suited to the sound-making element of the present invention and the above mentioned circuit of FIGS. 6 and 7, in the wound state. In this drawing, what is shown as 401 is a diaphragm ring, having an automatic diaphragm aperture mark AE and a manual diaphragm aperture mark punched thereon. The diaphragm ring 401 is retained in a rotatable manner within a lens barrel not being shown in the drawing.

A mark 402 serves to have the automatic diaphragm aperture mark AE matched with the manual diaphragm aperture mark and is provided at the lens barrel. A diaphragm presetting ring 303 is rotatingly biased to a clockwise direction by a spring 303a and has a projection 303b which can engage with a projected part 401a of the diaphragm ring 401. Also an arm 303c is provided at the diaphragm presetting ring 303. Further, the diaphragm presetting ring 303 determines an amount of rotation of a bell crank by a lever 303 planted thereon through a diaphragm setting cam ring not being shown in the drawing. The bell crank is to regulate a rotation of a diaphragm driving ring not being shown in the drawing to determine a degree of opening of a diaphragm.

A pin 304 is mounted on the diaphragm driving ring. The diaphragm ring 401, the diaphragm presetting ring 303, the spring 303a, and the pin 304 form a diaphragm aperture regulating means which regulates a diaphragm aperture to a set value and are build in a lens barrel. These may be also built in a so-called interchangeable lens which can be mounted or dismounted by a mounting means at a lens side or at a camera body side not being shown in the drawing. An end of the pin 304 engages with an automatic diaphragm level 305 which is rotatably biased by a spring 305a to a counter clockwise direction and constitutes an automatic diaphragm means. The automatic diaphragm lever 305 is so made as rotatable at a camera body or a ground plate thereof not being shown in the drawing and has a riser part 305c. An intermediate lever 307 is axially attached to a co-axial shaft 306 in co-axial manner with but independently from the automatic diaphragm lever 305. What is shown as 308 is a wind up or winding shaft of a wind up or winding lever not shown in the drawing and a wind up or winding cam 309 is fixed at an end plane of said wind up shaft 308. An intermediate lever 310 is provided rotatably at a ground plate, etc., and a pin 310a at one end of the intermediate lever 310 enages with the winding cam 309. Also, a pin 310b is provided at the other end of the intermediate lever 310, and said pin 310b engages with one end of the intermediate lever 307, and at a same time engages with one end 311a of a mirror driving lever 311. The mirror driving lever 311 is axially provided at a camara body or a ground plate not being shown in the drawing in a rotatable manner. Also a first lever 313 is charged by a pin 310c provided on the intermediate lever 310. The other end of the intermediate lever 307 is engageable with a pin 312a provided at one end of a charge lever 312 which is rotatable. Said charge lever 312 is axially provided at a ground plate, etc. and is rotatingly biased to a counter clockwise direction by a spring 312d.

An electromagnet Mg2 with a permanent magnet mentioned above constitutes a portion of a release means and engages one end 313a of a first lever 313, while a pin 313b mounted at the other end of the lever 313 engages one end 314a of a release lever 314. The release lever 314 is rotatably provided at a ground plate. The lever 313 is biased clockwise by a spring 313c. When the lever 310 turns clockwise, the pin 310c rotates the lever 313 counterclockwise at one end 313d of the lever 313 against the force of the spring 313c.

A pin 314d at one end of the release lever 314 engages one end 314a of a mirror drive engaging lever 315 whose other end 315b engages one side 311c of the mirror driving lever 311. One end of an AE checking lever 316 which is rotatable is checked by an end 314d of the release lever 314. Also, the release lever 314 is rotatably biased clockwise by a spring 314f weaker than the spring 313c. A sector gear 318 engages the associating member 303c of an interchangeable lens through a signal lever 329. The sector gear 318 is checked by the other end of the checking lever 316.

Gears 319a, 319b and a stop wheel 319c constituting a speed regulating mechanism 319 engage the sector gear 318. Also, a sliding piece or slide contact 318b of the variable resistance (variable resistor) VR1 is attached to the sector gear 318 and forms a conversion means to determine a diaphragm aperture presetting value.

A gear 320 is attached to a shaft 318a of the sector gear 318, and a charge gear 321 engages the gear 320. A lever 327 is coaxially secured to the gear 321 contacts the other end 312e of the charge lever 312. A pin 318d is mounted at said sector gear 318 and an end of the pin 318d is secured to a signal lever 329 axially provided at a supporting lever 328. A bent part of the signal lever 329 checks the arm 303c of the diaphragm aperture presetting ring 303 of the aforementioned diaphragm aperture regulating means. The sector gear 318 is rotatably biased by the spring 303a strongly to a clockwise direction resisting a power of a spring 318c which is rotatingly biased on the sector gear 318 to counter clockwise direction. A magnet Mg1 serves for controlling a diaphragm is controlled on the basis of the output of a comparator CP1 of a comparison means to be described below and the conversion means (VR1). The magnet Mg1 will be placed in a state in which no attracting power works when power is not supplied thereto. Also the above mentioned magnet Mg2 and a magnet Mg3 to be described below are magnets with permanent magnets, in which magnetic power works in a direction reverse to that of magnetic power of the permanent magnet when power is supplied thereto thus they will be placed in a state in which no attracting power works as a whole. Therefore, the magnet Mg1 will be checked by a Mg retaining lever 350 biased by a spring 350a in a state in which no power is supplied thereto. An attracting lever 330 is rotatably provided at a camera body or a ground plate not shown in the drawing and is biased counter clockwise by a spring 331a. A bent end of the lever 330 is engageable with a stop wheel 319c of the above mentioned speed regulating mechanism 319. Also, a stepped part 312f at the other end of the charge lever 312 contacts the other end of the attracting lever 330.

The mirror driving lever 311 has a delay device not shown in the drawing. The mirror driving lever 311 is biased to a counter clockwise by a spring 311d, and at a same time it is positioned so that its one end is checked by the end 315b of the mirror engaging lever 315 while the other end thereof can engage one end of the leader screen lever 333. The leader screen lever 333 is biased counter clockwise by a spring 333a, and its forward end engages a pin 334a mounted on a leader screen gear 334. Also, a pin 334b mounted on the leader screen gear 334 comes into contact with a count starting switch SW4. The leader screen gear 334 engages a leader screen pinion 335 of a leader screen drum not shown. Also, a mirror fixing lever 336 is checked by a projection 311b of the mirror driving lever 311. The fixing lever 336 is biased counter clockwise by a spring 336a being spanned between the push up lever 337, and one end thereof engages a push up lever 337 axially supported in a coaxial manner with the mirror driving lever 311. One end 337a of the push up lever 337 is rotated to clockwise direction by a mirror up action from an outside not being shown in the drawing so that a mirror up action can be made independently. The other end of said push up lever 337 checks a push up pin 338a provided at a mirror 338. Said mirror 338 is rotatable around a mirror shaft 338b moved by a mirror returning spring 338c. What is shown as a follower screen gear 339 is provided coaxially with but separately from the leader screen gear 334, and the follower screen gear 339 engages a follower screen pinion 339' for a follower screen drum not being shown in the drawing. Also, a pin 339a is mounted on the follower screen gear 339. An attracting lever 340 is rotated by the pin 339a and is attracted to a shutter control magnet Mg3 with a permanent magnet by its iron piece 340a. The attracting lever 340 is always biased by a spring 340b in such manner as being rotatingly retained to contact the magnet Mg3. A follower screen signal lever 341 is rotated by the pin 339a, and said lever 341 is always rotatingly retained by a spring 341a at a position of a checking pin 341b. An end 336b of the mirror fixing lever 336 is checked by the follower screen signal lever 341. What is shown as 347 is a shutter button, and a light sensing switch SW1 is made ON by a first stroke of said shutter button 347 and a release switch SW2 is made ON by its second stroke. What is shown as 351 is an ASA dial, and Rsv is a variable resistance to input a film sensitivity value. A variable resistance for RTv is set to the shutter time by the shutter time setting dial 357. A film sensitivity (Rsv) and a shutter time (RTv) may be set by separate dials as in FIG. 8 or may be so arranged as having plural number of dials overlapped at one place by a conventionally known method.

Figures 9, 12:
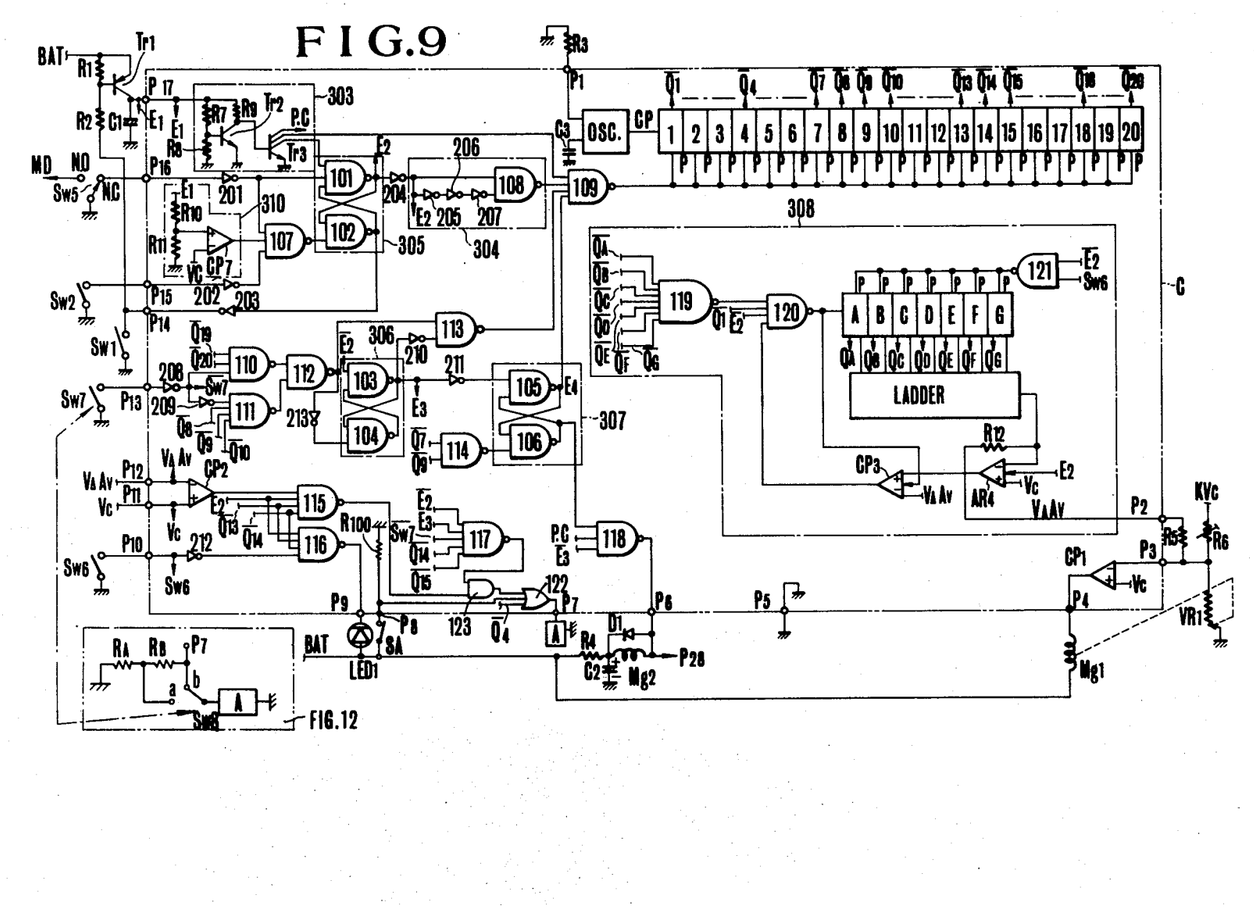
FIG. 9 is a diagram of a circuit to digitally control an exposure control operation in the present invention.
FIG. 12 shows a sound volume change over circuit for a sound-making element.

FIG. 9 shows a control circuit to digitally control an exposure control action of a camera having a sound-making element according to the present invention. A sound-making element of the present invention is to utilize a counting signal, of a binary counter to digitally control the above mentioned camera, for a driving circuit.

In this drawing, the circuit in a part C enclosed by dotted line is made as integrated circuit thereby simplifying the circuit arrangement. Terminals P1 to P17 terminals of the integrated circuit for applying and transmitting individual external parts or electric signals. A power supply signal BAT is from a power source circuit not being shown in the drawing. Member MD is a motor drive unit, and SW5 is a switch (FIG. 8) to detect a completion of a film wind up, and said SW5 is changed over from N.O. (normally open) to N.C. (normally closed). Switch is a change over switch for an automatic exposure mode and a manual exposure mode, and the pin 301b presses a movable piece of the switch SW6 and closes the same by having the diaphragm ring 301 of the diaphragm regulating means shown in FIG. 8 matched with the mark AE 302. Switch is a switch for a self-timer, and a self-timer in a camera shown in this example has its operation informed to a photographer by driving a sound-making element with an oscillation cycle of a counting signal utilizing the counting output of a binary counter which digitally controls the camera.

Circuit 303 is a power up clear circuit. A circuit formed by with a transistor Tr1, resistances R1, R2, a capacitor C1, etc. is a power supply circuit to have power supplied thereto by a switch SW1 being closed by a release action of a camera. A symbol E1 shows that a high level of electric signal (a high level as a logical signal is shown as "1") is output at a collector terminal of the transistor Tr1 when the power supply circuit is in operation. A circuit shown as 310 is a battery check circuit and compares the output signal E1 of a power supply retention circuit with the reference voltage Vc by a comparator CP7, and when a power source voltage is sufficiently high the output of CP7 becomes "1". A flip-flop circuit 305 is composed of NAND gates 101, 102 and serves to detect the operating state of the camera, and when a power source voltage is sufficiently high and a camera is in a releasing state (that is the switch SW2 is ON) and when a camera is in a state in which film windup is completed (that is the switch SW5 is at N.C. side), an electric signal ("0") of a low level is produced at a signal E2 and an electric signal of high level (high level as a logical signal is shown as "1") is produced at a signal $\overline{E2}$. What is shown as 304 is a delay circuit consisting of inverters 205, 206, 207 and a NAND gate 108. When an input of 304 becomes 1 from 0 in the delay circuit, the output of the NAND gate 108 is made "0" for a delay time determined by the inversion time of the inverters 205, 206, 207.

Symbols 1 to 20 constitute a binary counter, and P is its presetting input terminal. The output of the counter satisfies Qn="1", $\overline{Qn}$="0" when P="1". A CR oscillator OSC oscillates at an oscillation cycle (clock cycle) determined by a resistance R3, a capacitor C3, the binary counters 1 to 20 and the CR oscillator OSC constitute a digital timer circuit $\overline{Q1}$ . . . $\overline{Q9}$ . . . $\overline{Q20}$ show outputs of the binary counter. A circuit 308 is an AD converter. An output signal of a conversion means (VR1) of the above mentioned automatic exposure control means and the memorized signal (V'ΔAV) are compared by the comparator CP1 to activate the magnet Mg1 and determine an exposure. Elements A, B through G in the circuit 308 form a binary counter, and P is its presetting input terminal, and such set up is employed that the output of the counter will be Qn="1" and $\overline{Qn}$="0" when P="1". What are shown as 119, 120 are NAND gates, and LAD is a resistance circuit network. A comparator CP3 compares an output signal (VΔAV) of the exposure value operating circuit and an output signal (V'ΔAV) of the operational amplifier AR4 being DA converted by LAD, R12, and to control the counting action of the counters A to G for stopping the counting action and memorizing the output signal of AR4.

A flip-flop circuit 306 is formed by NAND gates 103, 104. A circuit made of component parts 208, 209, 110, 111, 112 has a function to detect whether a self-timer is working or not. Now, if a photographing mode is not set at a photo-taking by a self-timer, a switch SW7 for setting a self-timer becomes OFF. By this an output of the inverter 208 becomes "0" and an output of the inverter 209 becomes "1". When $\overline{Q8}$, Q9, $\overline{Q10}$ all become "1", an output of the NAND gate 111 becomes "0" from "1". That is, an output E3 of the flip-flop 306 becomes "0" from "1" after an elapse of time determined by $\overline{Q8}$, Q9, $\overline{Q10}$.

A flip-flop circuit 307 is formed of NAND gates 105, 106 to control operation of the magnet Mg2, which conducts a release action of the camera. What is shown as A is a sound-making element mentioned above for FIG. 1(a), (b) used in the present invention and is connected to an output terminal of an OR gate 122. What is shown as SA is a sound-stopping switch connected to between the output terminal BAT and the terminal P8. What are shown as 110, 112, 113, 114, 115, 116, 117, 118 are NAND gates. What are shown as 201, 202, 203, 210, 211, 212 are inverters. What is shown as 123 is an AND gate. What is shown as LED is an illumination element.

The camera shown in FIGS. 6 to 9 operates as follows.

(1) Light sensing action:

When a power source switch not shown in the drawing is closed and a wind up action is completed the wind up detection switch SW5 comes in contact with N.C. (FIG. 9). As a first stroke of a shutter button 347 is pressed the light sensing switch SW1 is closed and the transistor Tr1 conducts thus power is supplied to the circuits. At a same time, the transistor Tr3 of the power up clear circuit 303 conducts and the output of the Tr3 becomes a low level of signal (logic "0"). Said signal in a low level is input into the NAND gate 109 then the output signal of the gate 109 becomes a signal of high level (logic "1"), thus the binary counters 1 to 20 are reset.

Also, the flip-flop 305 is reset by the "0" output from Tr3 and a signal from the battery check circuit 310 is input, then the light sensing action is memorized by the flip-flop 305 thus an initial stage is secured that is E2 becomes "1". After that, as a potential of the capacitor C1 being connected to the collector of Tr1 goes up, the transistor Tr2 conducts, thus the transistor Tr3 will not conduct. The flip-flop 306 is set at an initial stage by the inversion output signal $\overline{E2}$ of the E2, and the output signal E3 becomes "1".

Moreover, the flip-flop 307 is also set at an initial stage by the invention output $\overline{E3}$ of E3, and the output signal E4 is set at "1". By this, the presetting input of the AD-DA converter 308 that is the output of the NAND gate 121 becomes "1", and the counters A to G are preset. Also, as E2 is "1", the operational amplifier AR4 is controlled and its output is connected to ground. Therefore, the output of the comparator CP1 becomes "1" and the magnet Mg1 is not magnetized in this state, thus the above mentioned electro-magnetic means (FIG. 8) will not function.

When a first stroke of the shutter button 347 is operated and the light sensing switch SW1 is closed, power is supplied from the power source circuit to the constant voltage circuit then is supplied to the exposure control circuit of FIG. 6, thus the light sensing circuit, the exposure value operating circuit, and the exposure value indication means will function. When the output (V∆AV) of the exposure value operating circuit, in a relationship between the light sensing output (BV) of the light sensing circuit and the set photo-taking information (VR3), is higher than the reference voltage Vc, the output of the comparator CP2 becomes "0". This causes, the output of the NAND 115 become "1". In this case the sound-making element A will not generate the sound signal.

Figure 10:
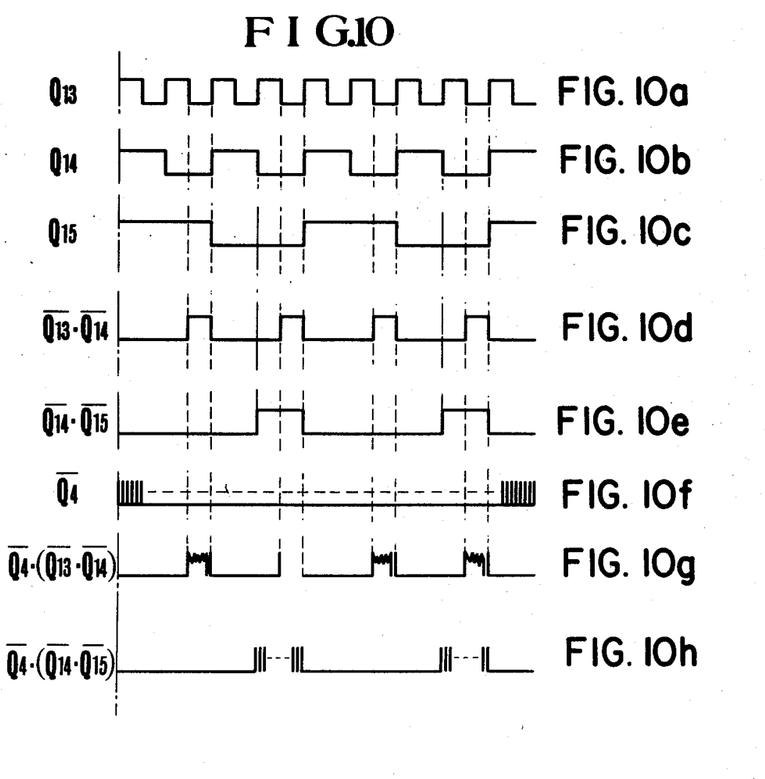
FIG. 10 is a pulse waveform diagram to show the difference between pulses at a time a low brightness warning is given and pulses at a time a self-timer is operated.

(2) Explanations on a sound-making function when a light from an object is below a reference value in a light sensing operation:

In such case, since the light sensing circuit is working from the moment the switch SW1 becomes ON as mentioned before, an aperture stop-down step number information V∆AV from the light sensing circuit being input into the terminal P12 is compared with the reference voltage Vc, and V∆AV becomes lower than Vc (V∆A-V<Vc). Therefore, the output of the comparator CP2 becomes "1" and the input of the NAND 115 becomes all "1" when $\overline{Q13}$ and $\overline{Q14}$ both become "1", as the counter is working then as mentioned above, and the output of 115 becomes "0" (Refer to pulses shown in FIG. 10(d)). What is shown as SA is a switch to place a sound for indicating a warning in OFF state. When the SA is OFF, 1 input of an OR gate 122 becomes "0" by R100. And as the output of 115 is "0", 1 input of the AND gate 121 becomes "0" while the output of 122 becomes "0". Therefore, the output of 122 becomes ON and OFF with a cycle of $\overline{Q4}$ during a period when the output of 155 is "0" by the signal of $\overline{Q4}$. That is, the gate 122 becomes ON and OFF in synchronism with an oscillation cycle of pulses of FIG. 10(g) and impresses energizing energy to the sound-making element A. As a result, the sound-making element A connected to the terminal P7 generates sound to provide a warning that brightness is low. Sounds of said sound-making element become intermittent ones as audible sounds of an audible frequency oscillator being impressed on the sound-making element is made intermittent by a cycle of the counter. Also, it is possible to make 1 input of 122 as "1" so that no sound is generated by placing the SA in ON stete.

(3) The photo-taking operation of a camera:

The shutter buttons SW1, SW2 are closed from the state of (1) mentioned above to conduct photo-taking operation.

At this time, the SW2 is made ON in an association with a second stroke action. As the SW2 is made ON, the output of Iv 202 becomes "1", also the output of Iv 201 becomes "1" as the SW5 is connected to N.C. In this state, a divided voltage of the power source voltage E1 and a constant voltage Vc are compared by the comparator CP7, and when the divided voltage value of E1 is sufficiently high compared to Vc (that is when a power source voltage is sufficiently high), the output of CP7 becomes "1". Because of these signals the input into the NAND 107 all become "1", thus the NAND 107 outputs "0".

Since the output of the gate 102 thus becomes "1", FF 305 is inversed and its output E2 becomes "0" from "1". Also since the output of Iv 203 becomes "0" from "1" by virtue the output of the gate 102, and the base resistances R1, R2 of the transistor Tr1 is connected to ground through the terminal P14, the transistor Tr1 is retained in ON state even if the switch SW1 is made OFF and power supply to the circuits is maintained. Hence, as B2 becomes "0", the output $\overline{E2}$ of Iv 204 becomes "1" and the output of a one shot circuit 304 becomes "0" by a delay time determined by Iv 205, Iv 206, Iv 207. Therefore, the output of NAND 109 momentarily becomes "1" and the counters 1 to 20 are preset again, thereafter the NAND 109 is inversed from "1" to "0", and a counting of clock pulses from CP is started. Also, as E2 becomes "0", a control over the operational amplifier AR4 of the AD—DA converter 308 is released and the output of AR4 is released from its state as being grounded. Because the output of AR4 is transmitted to an input terminal of CP1 and the output of AR4 corresponds to a set state of the counters A to G being preset, the electric potential of the inversion input terminal of CP1 becomes high, therefore CP1 is inversed and the magnet Mg1 for AE is magnetized. Because the input signal $\overline{E2}$ into the NAND 120 becomes "1" and the output of CP3 becomes "1" while the output of the NAND 119 also becomes "1" under said state, the signal of the output $\overline{Q1}$ of the counter 1 is transmitted to the counters A to G of the AD—DA converter through the NAND 120.

When a camera is switched to an automatic photography mode when SW6 if OFF, the output of NAND 121 changes to "0" from "1" and the counters A to G start counting. By this, when the output of the operational amplifier AR4 descends stepwise and the signal V$\Delta$AV from the light sensing circuit and said output of AR4 become equal to each other, the converter CP3 is inversed to output "0", then to output "1" without any relationship with the output $\overline{Q1}$ of the NAND 120, and the counting action of the counters A to G is stopped, thus such digital values as corresponding to V$\Delta$AV are memorized in the counters A to G. Also, effect by noise at a time of counting by the counters will be eliminated by controlling CP3 by the output of the NAND 120.

(4) Explanations on a case when a self-timer is used in a state of (3):

In this case, since the switch SW7 is ON, and the output of Iv 208 is "1", the output of the NAND 110 becomes "0" from "1" when the outputs $\overline{Q18}$ and $\overline{Q20}$ of the counters both become "1". By this the NAND 112 outputs "1", and the output of Iv 213 becomes "1". Because the gate 104 becomes "1" and E2 also becomes "0" by the action of second stroke that is $\overline{E2}$ becomes "1", FF306 is inversed and its output E3 becomes "0" from "1". Therefore, the NAND 113 outputs "0". Then the output of the NAND 109 becomes "1" and the counters 1 to 20 will be preset again. When the counters are preset, $\overline{Q1}$ to $\overline{Q20}$ become "0", therefore the NAND 112 becomes "0". Therefore, the NAND 113 returns to "1", thus the output of the NAND 109 becomes "0" and counting is started again. Therefore, the NAND 118 becomes "0" during a period of time from a moment E3 becomes "0" from "1" till a moment $\overline{Q7}$, $\overline{Q9}$ both become "1". Hence, the Mg2 is magnetized to actuate a camera starting member for initiating a photo-taking. That is, when a self-timer is used, shutter time control pulses are output with such delay in time as from a moment the counters start counting from the second stroke till a moment both $\overline{Q18}$, $\overline{Q20}$ become "1".

(5) Explanations on sound-making action when a self-timer is used under a state of (4):

When E2 becomes "0" by the second stroke action of the shutter button as a self-timer is used, $\overline{E2}$ becomes "1", and when $\overline{Q14}$, $\overline{Q15}$ both become "1" while E3 is "1" and SW7 is ON, the output of the NAND 117 becomes "0" and 1 input of the gate 123 becomes "0". Thus output of the gate 123 becomes "0". As the output of the gate 123 becomes "0", 1 input of the gate 122 becomes "0".

When the switch SA is OFF, the output of the gate 122 gives the sound-making element A an energizing signal in synchronism with the signal of $\overline{Q4}$ based on the pulse of FIG. 10(k). Thus the sound-making element generates sound, indicating that a self-timer is in use.

As can be realized from FIG. 10, said sound will have different sound-making cycle from that of the sound signal (g) for warning low brightness of the (2) mentioned above. Therefore, a photographer can distinguish the low brightness warning and the sound signal of a time when a self-timer is used.

When the signal E3 of the flip-flop 306 becomes "0" by completion of the timer action, the output of the NAND 117 becomes "1" and the sound-making element A stops making the sound.

As the SA is made ON, 1 input of the gate 122 becomes "1". Hence sound-making can be stopped.

(6) The release action of a camera after a self-timer completes its action is as follows. When E3 of the flip-flop 306 becomes "0" by completion of the action of the self-timer, the NAND 113 outputs "0" and the output of the NAND 109 becomes "1". By this the counters 1 to 20 are preset.

When the counters are preset, the output signals of $\overline{Q1}$ to $\overline{Q20}$ become "0", thus the NAND 112 becomes "0". Therefore, the NAND 113 returns to "1", thus the output of the NAND 109 becomes "0" and the counting by the counters is started again. Therefore, the NAND 118 becomes "0" during such period of time from a moment the E3 becomes "0" from "1" till a moment both $\overline{Q7}$, $\overline{Q8}$ become "1", and the magnet Mg2 for release is magnetized. The checking of the first lever 313 is released by magnetizing Mg2, and the first lever 313 rotates to clockwise direction by the spring 313c. That is, one end 314a of the release lever 314 resists the spring 314f by the pin 313b of the first lever 313, thus the release lever 314 is rotated to a counter clockwise direction.

Because of this, the engaging lever 315 for mirror driving rotates by the pin 314b. The rotation of the release lever 314 counter clockwise causes the checking lever 316 to rotate counter clockwise thereby ending engagement with the sector gear 318. The retaining lever 350 rotates to the left together with the release lever 314. Also, since the rotation of the sector gear 318 shifts the signal lever 329 downwards through the pin 318d, the diaphragm presetting ring 303 having the arm 303c checked with said signal lever 329 rotates the sector gear 318 to a clockwise direction by the spring 303a resisting the spring 318c. Therefore, the gears 319a, 319b, 319c forming the speed regulating mechanism 319 rotate and the stop wheel at the last step is rotated to counter clockwise direction. Also, the sliding piece 318b of the variable resistance VR1 is moved by the rotation of the sector gear 318.

The output V'$\Delta$AV of the memory circuit of FIG. 9 and the resistance value of said variable resistance are compared by CP1. When a prescribed level is reached the power supply to Mg1 is cut off so as to release the iron piece 331. Therefore, the spring 331a rotates the attracting lever 330 rotates counter clockwise and its bent part engages the stop wheel 319c to stop the rotation of the stop wheel 319c. Therefore, when the rotation of the sector gear 318 is stopped as mentioned, the diaphragm presetting ring 303 is rotated to a position of appropriate diaphragm aperture value. This determines the position of the bell crank. In other words, the position at which the diaphragm presetting ring 303 is stopped will result in a diaphragm aperture value determined by the information from the light receiving element SPD which senses light through a taking lens and by the various set data such as a shutter speed, a film sensitivity, an exposure correction information. On the other hand, the automatic diaphragm mechanism is started in parallel with the start of such AE action.

In this arrangement, the first lever 313 rotates clockwise in response to the spring 313c and the release lever is rotated counter clockwise. Hence, the end 315a of the mirror engaging lever 315 rotates clockwise in response to the pin 314b. That is, the checking of one side 311c of the mirror driving lever 311 and one end 315b of the mirror engaging lever 315 is released, and the mirror driving lever 311 rotates to counter clockwise direction by the spring 311d. At a same time, because a claw part 311b of the mirror driving lever 311 and the fixing lever 336 are in a checking state, the push up lever 337 axially supporting the fixing lever 336 rotates to counter clockwise direction. Therefore, the lever 337 is checked with the riser part 305c of the automatic diaphragm lever 305 by the bent part 337b of the push up lever 337 to rotate the automatic diaphragm lever 305 to clockwise direction. By this, the pin 304 mounted on the diaphragm driving ring is actuated and the diaphragm is stopped down according to a position of the bell crank being preset. Also, the push up pin 338a of the mirror 338 is pushed up by the rotation of the push up lever 337 to counter clockwise direction and the mirror 338 is pushed up.

During the push up action of the mirror 338a a delay device not shown in the drawing functions, and the leader screen 333 is rotated clockwise by the mirror driving lever 311 after a delay time of the delay device. The delay time of the delay device is to conduct a shutter start after an elapse of time from the maximum diaphragm aperture to the minimum diaphragm aperature. Thus, the leader screen gear 334 starts rotating and runs the leader screen through the leader screen pinion. As the leader screen runs the count starting switch SW4 is turned OFF by a known method, and after an elapse of such period of time as determined by the variable resistance RTv having such resistance as corresponding to the set shutter speed, a control circuit Y is activated and pulses are added to the magnetizing coil Mg3. Therefore, magnetic power of the permanent magnet and the magnetic power of the magnet Mg3 are offset each other thus losing attracting power. Thus, the locking of the follower gear 339 by the attracting lever 340 is released. Therefore the follower screen gear 339 starts rotating to run the follower screen through the follower screen pinion 340. Also, at a time when the follower screen completes running, the follower screen signal lever 341 rotates to counter clockwise direction with the pin 339a by the rotation of the follower screen 339, to rotate the mirror fixing lever 336 to clockwise direction. The engagement with the mirror driving lever 311 is released by said rotation of the mirror fixing lever 336. Therefore, the push up lever 337 rotates to clockwise direction by the spring 305a through the automatic diaphragm lever 305, and the mirror 338 returns to its original position by the returning spring 338c. Also, at a same time, the automatic diaphragm lever 305 rotates counter clockwise in response to the spring 305a and the pin 304 mounted on the diaphragm driving ring returns and an original release state is resumed.

Also, when the follower screen gear 339 rotates the wnd up completion switch SW5 is changed over from N.C. side to N.O. Side, and the output of the inverter 201 becomes "0", therefore the flip-flop 305 is reset. The flip-flops 306 and 307 are also reset by the resetting of 305. When the wind up shaft 308 now winds the film, the shutter is energized and at the same time the charge lever 312 is charged through the intermediate levers 310 and 307, and the engagement parts, released by said release action in which the automatic diaphragm mechanism and the mirror mechanism are charged, engage again and a state shown in FIG. 8 is resumed again.

Figure 11:
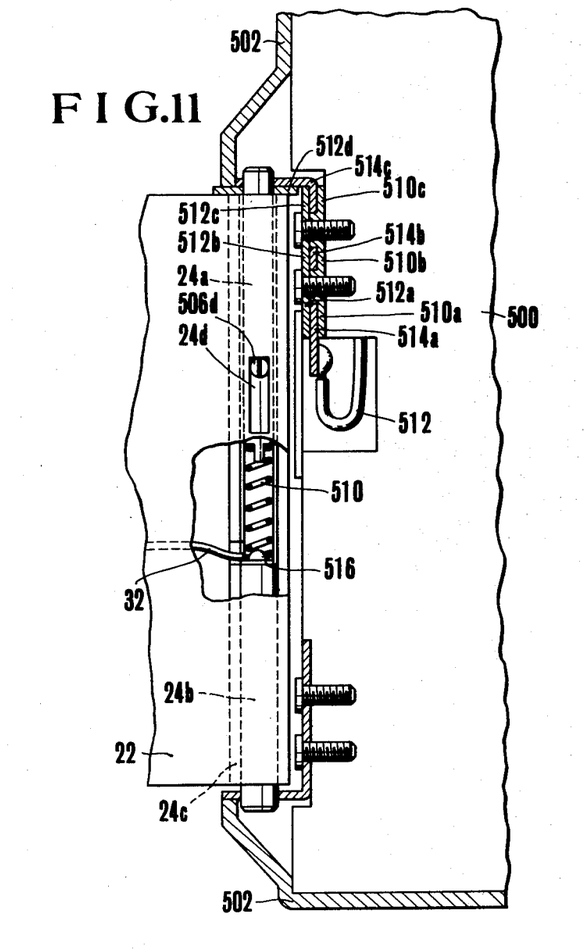
FIG. 11 is a cross sectional view of a back lid attaching part to show a method of transmitting signals for controlling the sound making of a sound-making element when the element is fixed at the back lid of the camera.

FIG. 11 illustrates an example of a structure which illustrates a method of transmitting signals between a sound-making element and the terminal P7 when a sound-making element is attached to a back lid of a camera.

In this drawing, what is shown as 500 is a camera body 502 is an upper lid, 584 shows a back lid. The back lid 504 is assembled to a camera body by hinge shafts 24a, 24b in a manner allowing to be opened and closed. One of the hinges 24a of the back lid 22 is biased to an upper direction by a spring 510 within a shaft tube 24c of the back lid 22. What are shown as 510a, 510b, 510c are insulating plates fixed on the camera body. Control signals for sound-making of the terminal P7 of FIG. 9 is transmitted to the hinge shaft 24a from a cord 512 through collectors 514a, 514b, 514c, further it goes through a spring 510 and is input into a sound-making element by a cord 32 being soldered to a pattern plane on a printed plate 516 contacting an end of the spring. A groove 24d is provided at a shaft tube housing the hinge shaft 506b, and what is shown as 506d is a pin to release the engagement with the hinge 24a at a time the back lid is assembled and disassembled.

FIG. 12 shows a sound volume change over circuit for a sound-making element, wherein a change over of load resistances RA, RB to a sound-making element A is made by a switch SW8, generating a big sound when the SW8 is at a side, and generating a small sound when it is at b side, thus allowing a change over of sound volume.

Also, a switch SW7 for a self-timer and the switch for sound volume change over are arranged in an associatable manner, so that a sound volume of the sound-making element is made big when a self-timer photography is made by pressing the self-timer switch SW7.

In this way, a photographer can find up that a self-timer is in operation even when he leaves a camera in such case as taking a snap shot.

The present invention provides the following effects.

(1) Since a sound-making element (a piezo buzzer element) used in the present invention can be formed with a very thin shape, it can be fixed at a place with a narrow space. Therefore, it does not need much space (cubic volume) compared to a conventional sound-making element using an electro-magnet and coil. Thus it meets the requirements of a present day camera for a small size and light weight.

(2) As a sound-making element can be placed on a back lid, a bottom lid, or an upper lid, etc. of a camera and a control of sound-making can be made using a transmitting means, various shapes of sound-making elements can be fixed on either a back lid, a bottom lid, or an upper lid, etc., and sounds of desired timbres can be used.

(3) Sound signals by a sound-making element of the present invention are used as information media for a low brightness warning (a high brightness warning) and an operating signal for a self-timer, therefore, more data can be provided for a photographer than those data which can be provided by conventional display signals, yet erroneous handling due to confusion and mis-interpretation of information can be prevented.

(4) As a result of (3) a view finder of a camera will not need any photo-taking data provided therein or only the minimum number of informations may be provided therein, thus a view finder can be made free of extraneous information.

(5) Since a sound-making action of a sound-making element in the present invention will not take place after a light sensing action or after completion of a counting action by a self-timer, a film will not be affected thereby even if a second-making element is fixed on a back lid, etc. of a camera.

(6) Since sound volume of a sound-making element can be manually or automatically changed over in the present invention, it is possible to have a loud sound for remote control photography or a self-timer photography so that a photographer or a person being photographed can hear signal for low brightness warning or for a self-timer operation.

What is claimed is:

1. A camera including:
a light sensing circuit for generating electric signals corresponding to an object brightness,
low brightness signal detection means responsive to an output signal of said light sensing circuit for producing an electric signal to indicate whether an exposure value is proper or not,
a self-timer, a self-timer switch for the self-timer capable of producing operation signals, said self-timer comprising:
(a) a sound-making element for generating a sound signal,
(b) detection means for producing a signal indicating improper exposure of the camera on the basis of the signal from said exposure value operation circuit,
(c) a pulse generator,
(d) first signal generating means for receiving the signal from said detection means and said pulse generator and generating a sound signal indicating an improper exposure condition, said first signal generating means being arranged for applying its output to said sound-making element and generating a sound signal at a predetermined frequency,
(e) signal output means for producing an operation signal during operation of the self-timer, and
(f) second signal generating means for receiving the signal from said signal output means and said pulse generator and generating a sound signal indicating the operative condition of the self-timer, said second signal generating means being arranged for applying its output signal to said sound-making element and generating a sound signal at a frequency different from that frequency at the time of an improper exposure.

2. A camera comprising:
(a) a self-timer;
(b) means to detect an operating state of said self-timer and to generate signals indicating an operation of the self-timer;
(c) detection means to detect that the state of the camera is unsuitable for photography and to generate signals indicating the unsuitable state;
(d) an acoustic element;
(e) an oscillator to oscillate said acoustic element; and
(f) control means for said acoustic element, said control means being responsive to signals indicating the operation signals from the oscillator, and signals indicating the unsuitable state, to make frequencies of the operation of the self-timer and of the unsuitable state different from each other for controlling the oscillation of the acoustic element.

3. A camera comprising:
(a) operation means to determine photographic conditions based at least upon light rays from an object;
(b) exposure control means to control an exposure based on signals from said operation means;
(c) a counter to generate pulses for digitally controlling actions by the exposure control means;
(d) detection means to detect whether an output of the operation means has a suitable value relative to a predetermined value and to generate unsuitable state signals when the output has unsuitable value;
(e) a self-timer;
(f) means to produce self-timer operation signals indicating an operating state of the self-timer;
(g) an acoustic element; and
(h) control means for controlling said acoustic element, said control means being arranged for responding to the detection means and the means to produce the self-timer operation signals and to the pulses of the counter for making frequency of the self-timer operating signals and the sequency of the signals indicating an unsuitable state different from each other by the pulses of the counter.

4. A camera according to claims 1, 2 or 3 further comprising:
(a) a sound volume changeover means to switch the volume of the acoustic element between high volume and low volume.

5. A camera according to claim 4, wherein:
the sound volume changeover means are arranged to respond to the self-timer operating signals for producing sounds at a high volume at one operating state of the self-timer.

6. A camera according to claims 1, 2 or 3, further comprising:
(a) means to stop sound production indicating the self-timer operation and sound production indicating the unsuitable state.

* * * * *